Aug. 11, 1936. R. E. McCLURE 2,050,719
AUTOMATIC TIME CONTROLLED TUNING MECHANISM FOR RADIO RECEIVERS
Filed Nov. 28, 1934 6 Sheets-Sheet 1
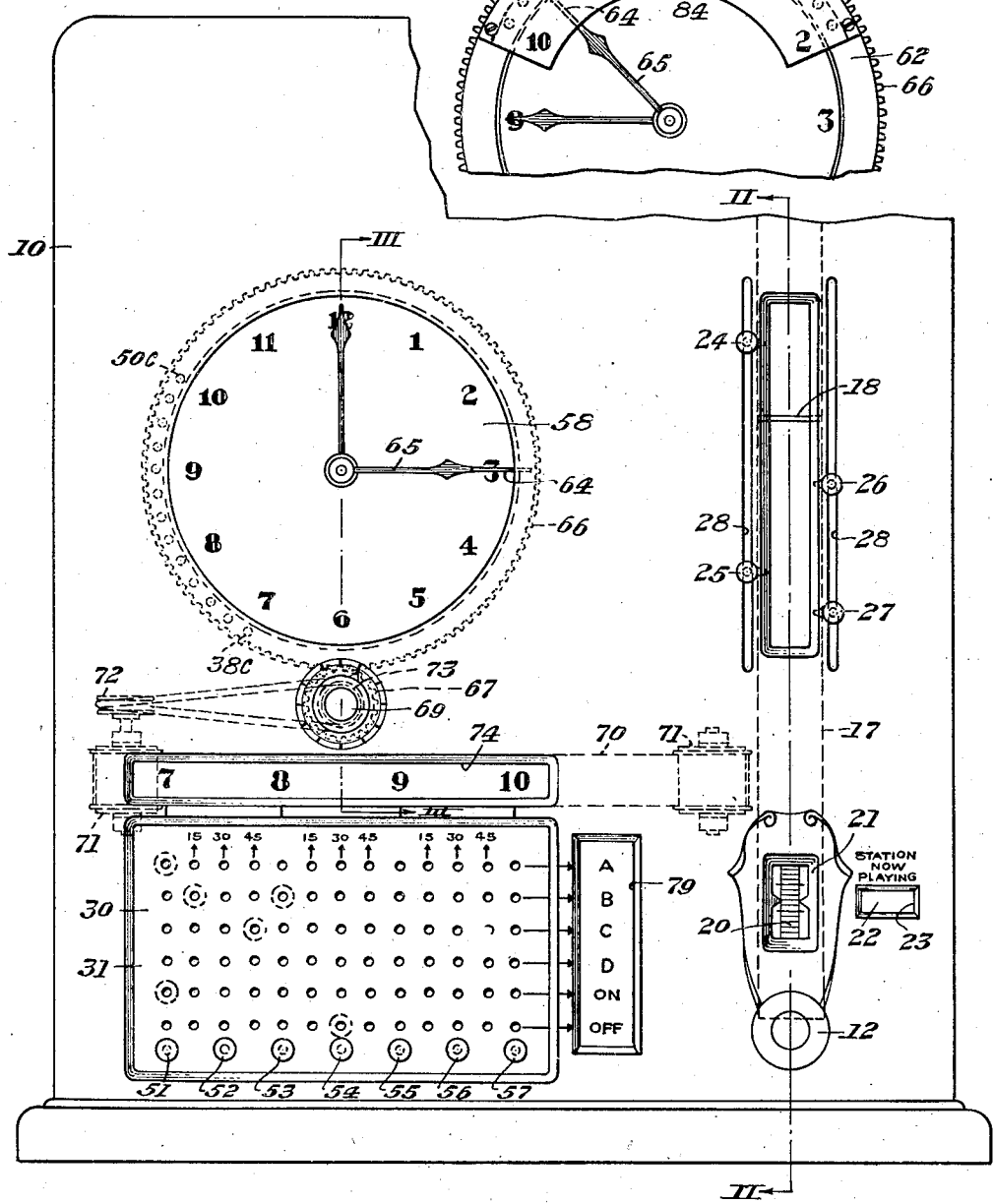
INVENTOR
Robert E. McClure
by his attorneys
Byrnes, Stebbins & Blenko Aug. 11, 1936.   R. E. McCLURE   2,050,719
AUTOMATIC TIME CONTROLLED TUNING MECHANISM FOR RADIO RECEIVERS
Filed Nov. 28, 1934   6 Sheets-Sheet 2
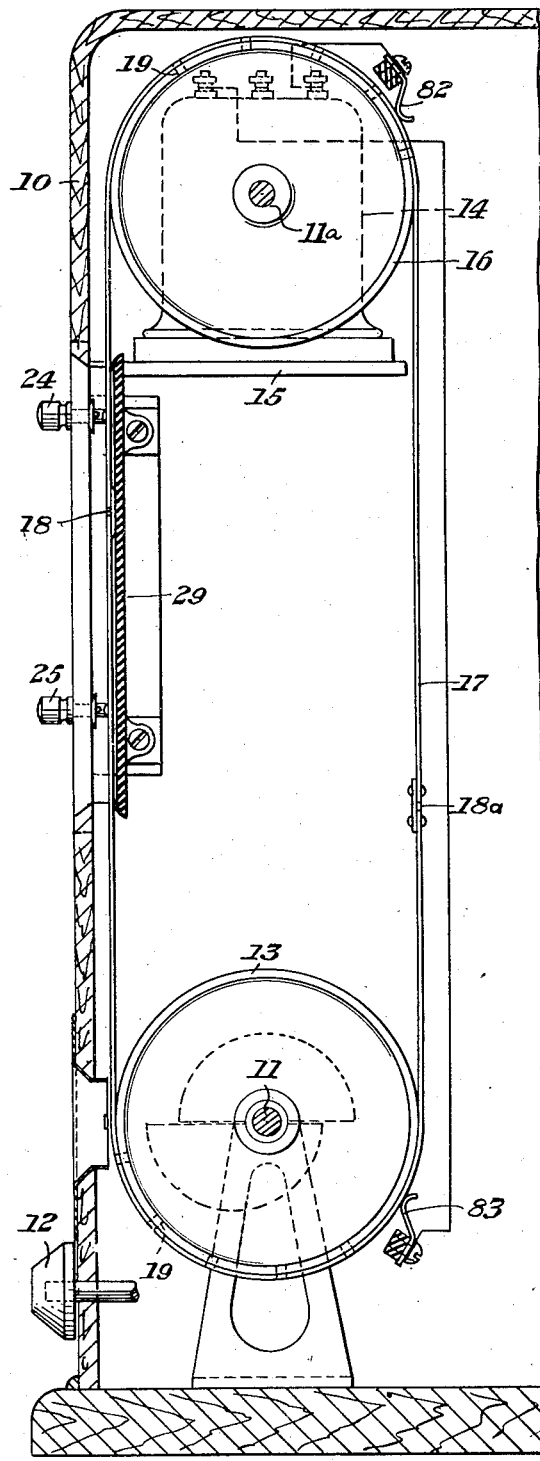
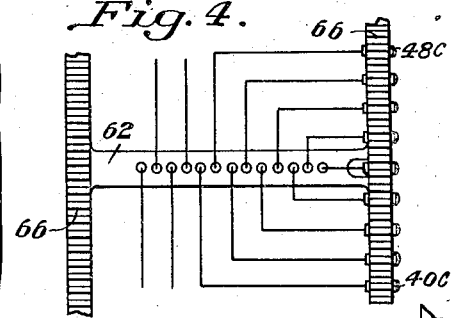
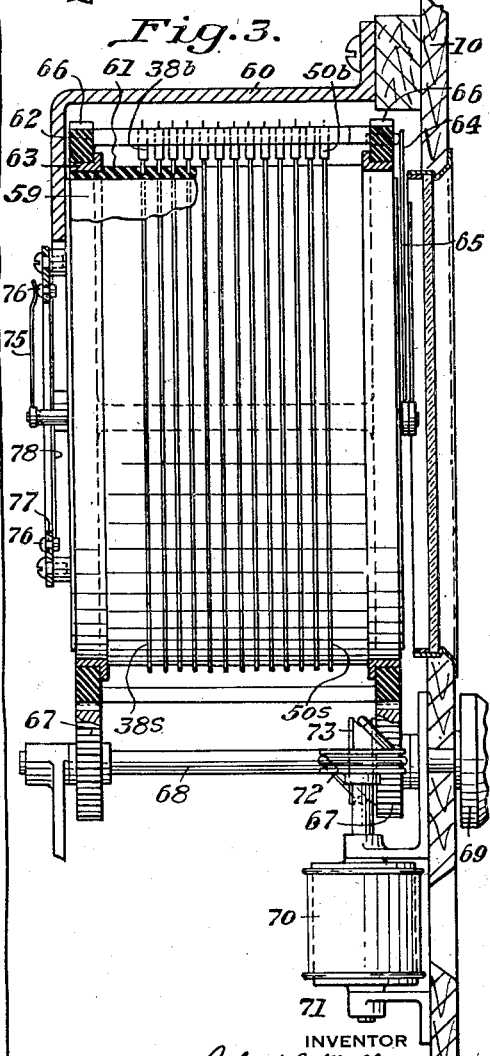
INVENTOR
Robert E. McClure
by his attorneys
Byrnes, Stebbins & Blenko

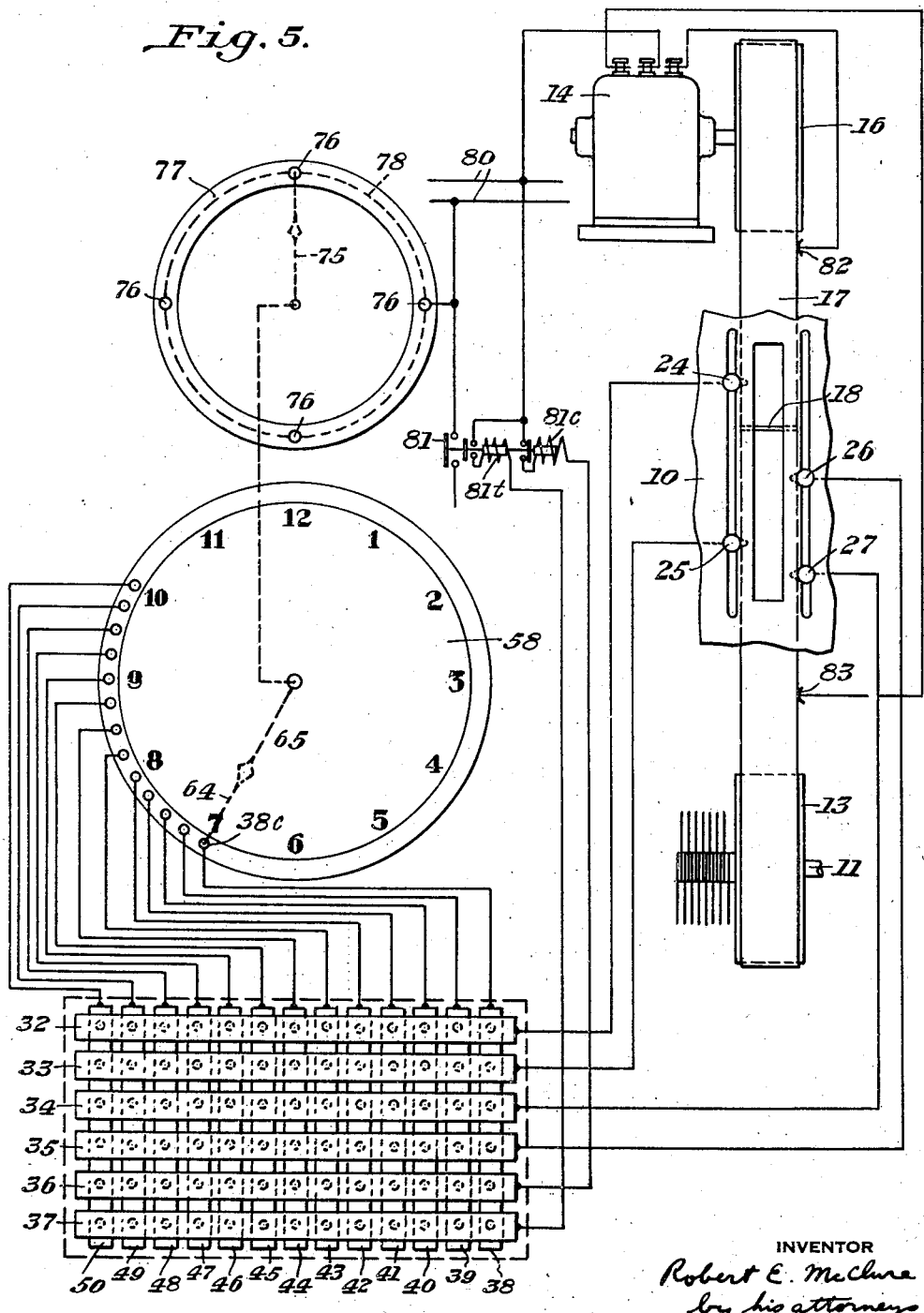

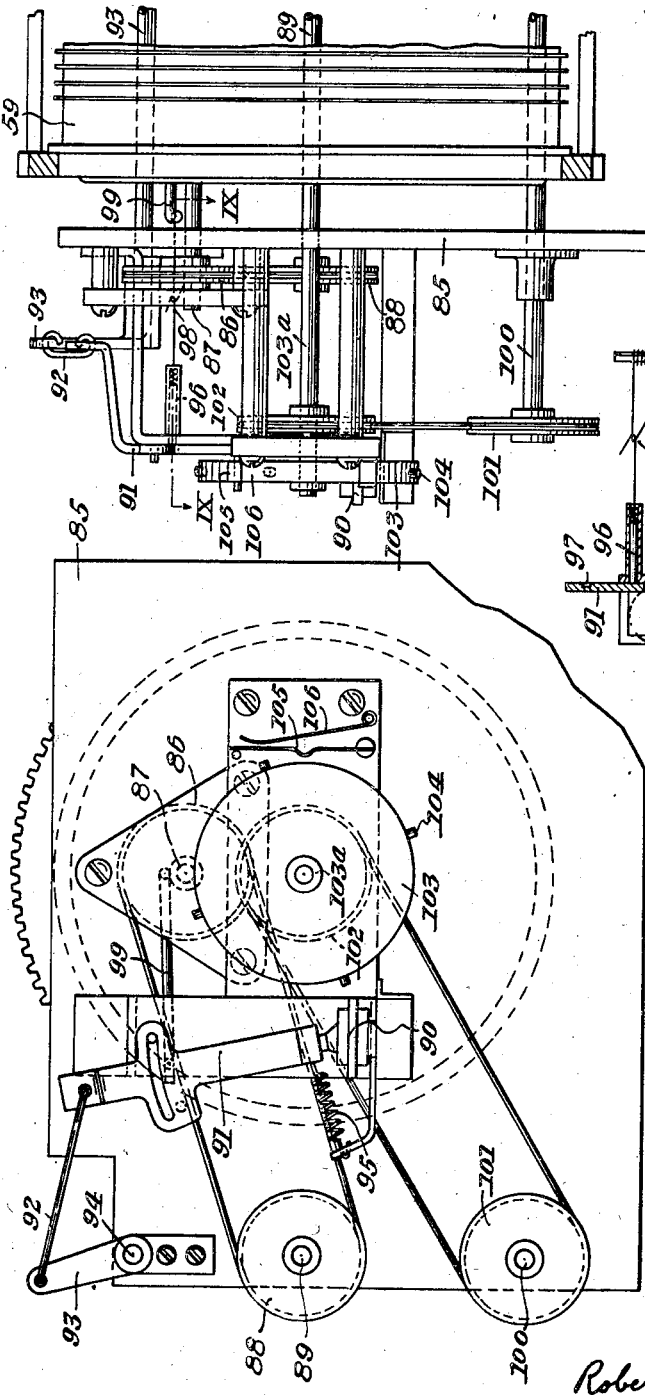

Aug. 11, 1936.   R. E. McCLURE   2,050,719
AUTOMATIC TIME CONTROLLED TUNING MECHANISM FOR RADIO RECEIVERS
Filed Nov. 28, 1934   6 Sheets-Sheet 5
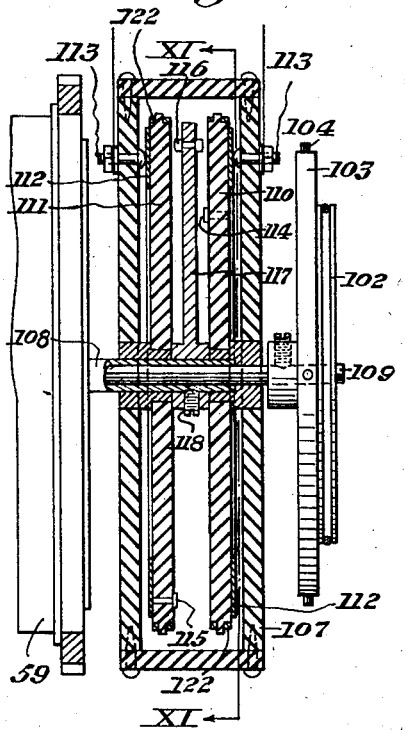
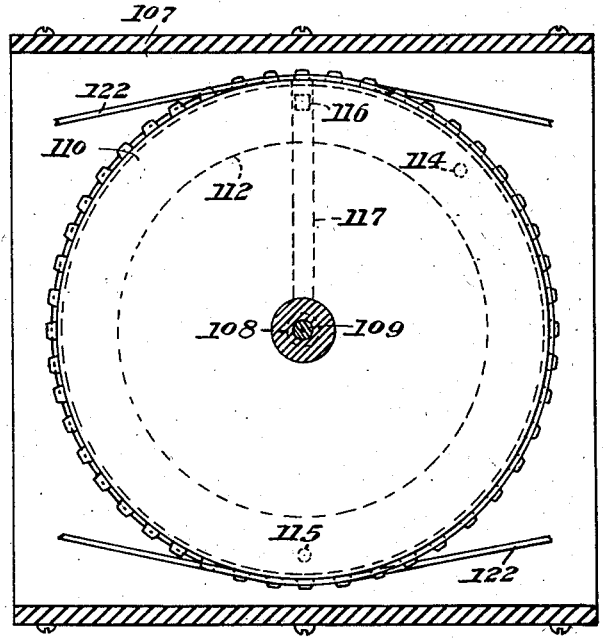
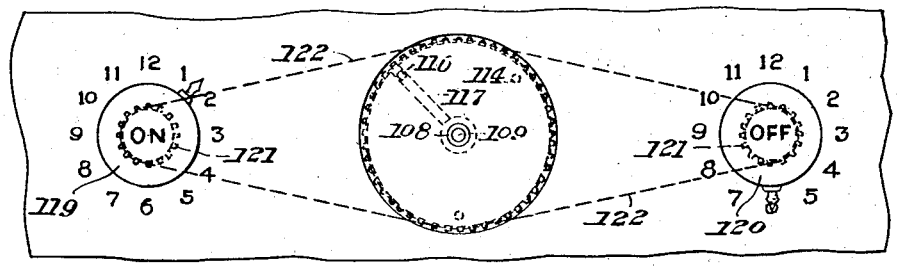
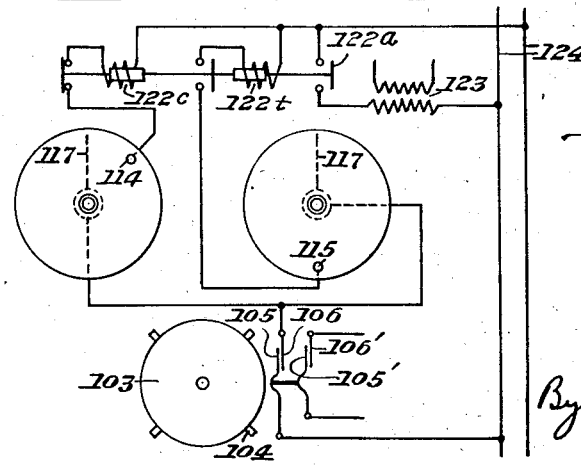
INVENTOR
Robert E. McClure
by his attorneys
Byrnes, Stebbins & Blenko

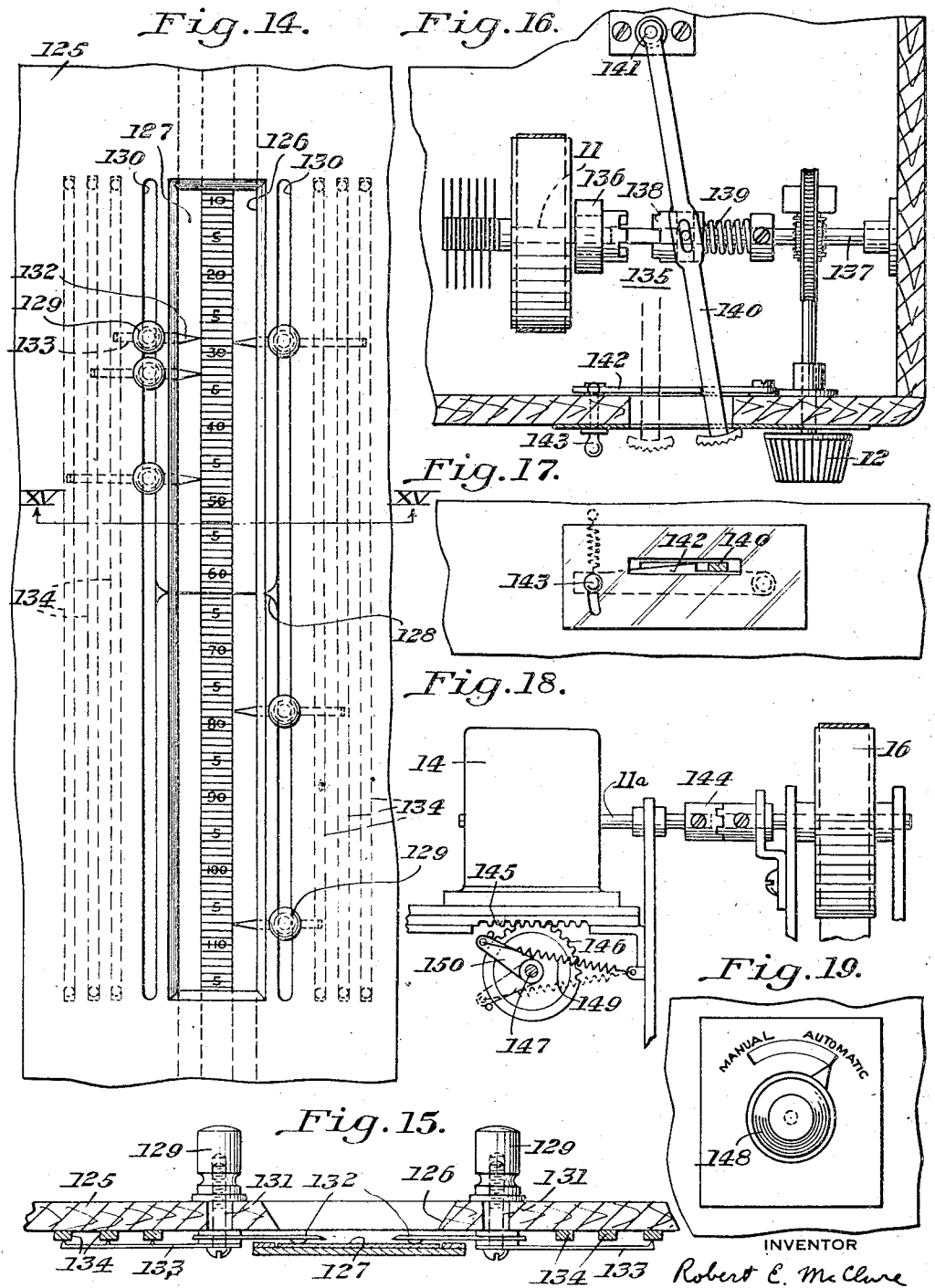

Patented Aug. 11, 1936

2,050,719

UNITED STATES PATENT OFFICE 2,050,719

AUTOMATIC TIME CONTROLLED TUNING MECHANISM FOR RADIO RECEIVERS

Robert E. McClure, Warren, Ohio, assignor to Raymond J. Wean, Warren, Ohio

Application November 28, 1934, Serial No. 755,169

12 Claims. (Cl. 250—20)

My invention relates to an automatic device for tuning a radio receiver to different stations at predetermined times, in accordance with a selected program arranged in advance, without the necessity for manual operation.

Numerous attempts have been made heretofore to provide means whereby a radio receiver may be tuned automatically to different stations at different times. All such devices with which I am familiar, however, are excessively complicated, bulky or expensive and those few which have actually been embodied in commercial radio receivers have, therefore, met with only limited acceptance on the part of the public.

My invention overcomes the objections to devices previously known for accomplishing similar objects, since it is of simple and inexpensive construction, is very compact, and may be embodied in receivers of types now more or less standard, without material change in either the interior or exterior construction.

In accordance with my invention, I provide a motor for actuating the tuning shaft of the receiver, and connect the motor to the tuning shaft through a conducting belt having insulated sections. A plurality of adjustable contact fingers disposed for engagement with the belt determine the position of an insulated joint between the sections of the belt and, therefore, the position of the tuning shaft. A switchboard having plugs and jacks for each of the stations to be selected and each quarter hour of the desired automatic control period, causes the operation of the motor to position the tuning shaft at different times in accordance with a preselected program.

An important feature of the invention is that the complication, bulk and expense of present types of automatic control systems are avoided by making the automatic control range of limited extent, say three or four hours, and providing means for shifting it so as to control the receiver automatically during any portion of the day, if desired. Means are also provided for indicating to the user the period for which the automatic control is set to operate.

For a complete understanding of the invention, reference is made to the accompanying drawings illustrating a present preferred embodiment. In the drawings:

Figure 1 is a front elevation, partly broken away, of a radio receiver having the invention incorporated therein;

Figure 2 is a vertical sectional view through Figure 1 along the line II—II;

Figure 3 is a partial sectional view along the line III—III of Figure 1;

Figure 4 is a partial plan view of a portion of the apparatus shown in Figure 3;

Figure 5 is a circuit diagram;

Figure 6 is a partial front elevation of a modified form of a portion of the apparatus;

Figure 7 is a rear elevation of an alternative form of automatic shut-off mechanism;

Figure 8 is a side view of the mechanism of Figure 7 with parts in section;

Figure 9 is a partial sectional view along the line IX—IX of Figure 8;

Figure 10 is a sectional view showing another form of mechanism for automatically turning on and shutting off the receiver at predetermined times;

Figure 11 is a sectional view along the line XI—XI of Figure 10;

Figure 12 is a partial front elevation of the receiver cabinet showing the opening therein for receiving the clock, and the means for adjusting the automatic on and off mechanism of Figures 10 and 11;

Figure 13 is a circuit diagram illustrating the operation of the mechanism of Figures 10 through 12;

Figure 14 is a partial front elevation of the receiver cabinet showing the modified form of construction of the adjustable contact fingers;

Figure 15 is a sectional view along the line XV—XV of Figure 14;

Figure 16 is a horizontal section through the receiver cabinet showing in plan the manual drive for a tuning shaft;

Figure 17 is a partial elevation of the cabinet with a portion in section;

Figure 18 illustrates the mechanism by which the driving motor may be disconnected from the tuning shaft; and Figure 19 is a partial elevation of the cabinet showing the means for controlling the mechanism of Figure 18.

Referring now in detail to the drawings, a radio receiver is mounted in a cabinet 10 and comprises the usual tuning shaft 11 for the variable condensers, as well as additional equipment such as transformers, filters, detecting, amplifying and rectifying devices, all arranged in the known manner. The tuning shaft 11 may be manually operated by a knob 12 through any suitable connecting means, many of which are already known and need not be described here. The tuning shaft is also provided with a pulley 13, for automatic actuation. A motor 14, which may conveniently be mounted on a bracket 15, drives a pulley 16 through a reduction gearing (not shown). A belt 17 traverses the pulleys 13 and 16. The belt is of conducting material, preferably metallic tape, and has insulated joints 18 and 18a between the ends of the sections. The pulleys have radial pins 19 projecting through holes in the tape whereby a positive drive of the tuning shaft by the motor is assured. The belt 17 also carries the usual tuning scale 20, a portion of which is visible through a sight hole 21 adjacent the knob 12 for manual tuning. The shaft 11 is also provided with a drum 22, the periphery of which may be observed through a sight hole 23. The drum 22 is adapted to receive designations showing the stations for which the receiver is tuned at various positions of the shaft 11.

Manually adjustable contact fingers 24, 25, 26 and 27 are movable in slots 28 in the face of the cabinet. These fingers are adapted to engage the sections of the belt 17, as shown in Figure 2. A backing plate 29 of insulating material supports the belt in engagement with the contact fingers. Each finger is adjusted to a position corresponding to that of the insulated joint 18 shown in Figure 1, when the shaft 11 is set to tune in a desired station. The adjustment of the fingers may be effected initially by manually tuning the set to different stations, and then setting the fingers for the different stations adjacent the positions of the insulated segment 18 at which the stations are properly tuned. The stations which are to be tuned in automatically may thus be chosen or changed as desired by adjusting the contact fingers.

The contact fingers are effective to control the motor 14 at the proper times, to cause automatic tuning, in a manner which will be described hereinafter. The contact fingers are rendered effective at the desired times by means of a switchboard 30. The switchboard 30 comprises a face 31 of insulating material having a plurality of holes arranged in horizontal rows corresponding to the stations it is desired to tune automatically and to the "on" and "off" positions of the main switch of the receiver, the holes also being arranged in vertical rows corresponding to the quarter hour divisions of an automatic control period of three hours, in the illustrated form of the invention. Back of the face 31 are disposed conducting strips 32 through 37 arranged in alinement with the horizontal rows of holes, and similar conducting strips 38 through 50, in line with the vertical rows of holes (see Figure 5 showing a rear view of the switchboard). The strips 32 through 35 are connected by flexible leads to the fingers 24 through 27. Each of these strips is thus identified with a station to be automatically tuned. The horizontal and vertical strips are separated by insulation and are punched to receive plugs 51 through 57 when inserted in the various holes on the face of the switchboard. These plugs are normally disposed in "dead" holes at the bottom of the switchboard. The plugs have conducting studs which connect the horizontal and vertical strips intersecting opposite the hole in the face of the switchboard in which the particular plug is inserted. While the switchboard 30 is, in the illustrated example, designed to control the receiver automatically throughout a period of only three hours, without resetting, it may be adjusted to effect automatic control at any desired three-hour period of the day.

The switchboard and adjustable control fingers are controlled by a clock 58, preferably an electric clock, although the details of the operating mechanism thereof are immaterial. As shown in Figure 3, the clock is enclosed in a case 59 supported behind the face of the cabinet 10 on a bracket 60. The case 59 is generally cylindrical in shape and is provided with a sleeve of insulating material 61 extending therearound. Slip rings 38s through 50s, corresponding to the vertical strips 38 through 50 of the switchboard, are embedded in the sleeve 61. A cage 62 of insulating material is mounted in bearing rings 63 for rotation about the clock case 59. The cage 62 carries brushes 38b through 50b engaging the slip rings 38s through 50s. As shown in Figure 4, the brushes are connected to contacts 38c through 50c extending outwardly on the side of the cage 62 adjacent the face of the clock which appears through a suitable opening in the front wall of the cabinet 10. The contacts 38c through 50c (of which only 40c through 48c appear in Figure 4), are spaced at quarter hour intervals relative to the clock face and are adapted to be engaged by an extension 64 from the hour hand 65 of the clock in the normal operation of the latter. Connecting leads extend from the slip rings to the corresponding switchboard strips 38 through 50 although, in Figure 5, the contacts 38c through 50c are shown as directly connected to the strips. The brush and slip ring assembly, of course, permits these connections to be maintained, regardless of the position of the contacts relative to the clock face and, in order to enable the device to exert automatic control at any desired period of the day, the contacts are adjustable to different positions around the clock face. The sides of the cage 62 have gear teeth formed thereon as shown at 66. Pinions 67 on a shaft 68 mounted below the clock mesh with these gear teeth and, by means of a knob 69, the contacts may be shifted to any position about the face of the clock.

An indicating tape 70 is trained about pulleys 71 journaled vertically inside the front face of the cabinet. A sheave 72 on the same shaft as one of the pulleys is belted to a sheave 73 on the shaft 68. The tape 70 is numbered corresponding to the clock face markings and a portion thereof is visible from the front of the cabinet through a sight hole 74. Since the tape is actuated by the adjustment of the contacts, it is evident that it will, if properly adjusted initially, always indicate the setting of the contacts and, therefore, the hours during which the device will effect automatic control of the receiver.

The clock 58, in addition to the minute hand visible on the face thereof, has another minute hand 75 rotating about the rear thereof. The hand 75 is adapted to engage contacts 76 positioned at 90° intervals around an insulating ring 77. The contacts 76 are all connected by a conductor 78.

Having described the construction of the invention, it is now in order to explain the automatic operation thereof. After deciding what period of the day he wishes to have the receiver operate under automatic control, the user operates the knob 69 to adjust the contacts 38c through 50c correspondingly. It will be apparent that the device may be set to start automatic operation at any time within the twelve hours succeeding the setting of the automatic control mechanism. After the contacts have been adjusted to the position shown in Figure 1, for example, it is then necessary only to insert one of the plugs 51 through 57 in the switchboard hole corresponding to a particular station, under the time at which it is desired to hear that station. It is also necessary to insert a plug in the hole opposite the designation "on" under the time when the first program is to commence. If a continuous series of programs is desired, it is necessary to insert additional plugs opposite other stations under the times when it is desired to tune them. If no program is desired during a certain period, a plug is inserted in the hole opposite the "off" designation under that time and another plug inserted under the "on" designation when it is desired to resume operation. The "on" and "off" holes control the main switch of the receiver in a manner to be explained shortly.

For a specific example, assume that it is desired to tune station "A" at 7:00 o'clock (either a. m. or p. m.) and station "B" at 7:15. The call letters of the various stations may conveniently be listed on a chart 79 beside the switchboard. One of the plugs 51 through 57 should be inserted in the switchboard hole under the "7" on the tape 70 and in line with the letter "A" on the chart 79. Another plug should be inserted in the 7:00 o'clock hole opposite the "on" designation. Another plug is inserted in the hole under 7:15 opposite the mark "B". As will be shortly explained, the setting of the tuning shaft when once fixed, is not changed unless additional plugs are inserted in the switchboard. If it is desired to hear station "B" until 7:45, for example, and then to listen to station "C", the next plug is inserted in the 7:45 hole opposite station "C". If it is now desired to hear station "B" again at 8:00 o'clock, another plug is inserted in the 8:00 o'clock hole for station "B". If it is desired to discontinue operation at 8:30, for example, a plug is inserted in the 8:30 hole opposite the "off" mark on the chart 79. Operation may be resumed at any desired time with any desired station by inserting the selecting and starting plugs as already explained.

Now that the desired program has been preselected, the automatic operation of the invention to produce the desired tuning of the receiver at different times will be explained. Assuming that the insulated segment 18 is in the position shown in Figure 1, as the result of manual tuning, for example, the engagement of the extension 64 of the hour hand 65 of the clock 58, with the contact 38c, which will occur, of course, at 7:00 o'clock, will complete a circuit to cause automatic operation of the motor 14 to tune in station "A". This circuit, however, will not be completed until precisely 7:00 o'clock as marked by the engagement of the minute hand 75 with its uppermost contact 76.

Under these conditions, a circuit is completed for the motor 14 as follows: From one side of a supply source 80 to one terminal of the motor 14 through the armature and either the forward or reverse field winding thereof in series, to a contact 82 having sliding engagement with the belt 17 above the insulated joint 18, and through the belt to the one of the contact fingers 24 through 27, in this case, the finger 24, which is connected through suitable flexible leads to the strip 32 engaged by the plug in the 7:00 o'clock position. The circuit extends from the strip 32 through the plug to the strip 38 and thence to the contact 38c, through the extension 64 and the hour hand 65 to the minute hand 75, the uppermost contact 76 and the other side of the supply line 80. The arrangement of the motor connections is such that when the contact finger corresponding to the selected station engages the belt 17 above the joint 18, the motor will drive the tuning shaft in one direction, while if the contact finger engages the belt below the insulating section, the other winding of the motor will be energized through a contact 83 similar to that shown at 82. In either case, the motor drives the belt in a direction such as to move the joint 18 toward the finger corresponding to the selected station. When the joint moves under the finger, the motor circuit is broken and the tuning shaft thus stops in the selected position, that is, in line with the finger 24.

At the same time, the main switch of the receiver indicated at 81 is operated. The switch has a closing coil 81c and a tripping coil 81t, both coils being controlled by auxiliary contacts so that their circuit is opened as soon as they have caused operation of the switch. The closing coil 81c is energized at 7:00 o'clock by the completion of the circuit from the upper side of the supply line 80 through the auxiliary contact of the closing coil 81c, the coil itself, contact strips 36 and 38, and thence through the clock contacts to the lower side of the supply source, as before. The receiver is thus turned on and tuned to station "A" automatically at 7:00 o'clock.

At 7:15, a circuit is similarly completed through contact finger 25. As before explained, this causes the energization of the reverse or forward field winding of the motor 14, depending upon the arrangement thereof, in any case, the winding other than that initially energized by the circuit including the contact finger 24, since finger 25 engages the other section of the belt 17, to reverse the rotation of the tuning shaft and bring the joint 18 into line with the finger 25. When this has been done, nothing further happens until 7:45 since there is no plug in the 7:30 row. It will be noted here that the apparatus is normally deenergized so that the movement of the hour hand extension 64 from one contact 38c to the next contact 39c has no effect until the precise instant of the quarter hour as measured by the minute hand 75, and unless a plug has been inserted in the vertical row of holes in the switchboard corresponding to that quarter hour. Any one station may thus be tuned in for an indefinite period. Correspondingly, the same station may be tuned in for any number of portions of the three-hour cycle merely by using a separate plug for each portion. A high degree of flexibility of control is thus provided.

Continuing the program already mapped out, station "C" is automatically tuned in at 7:45 in the manner already described and station "B" again at 8:00 o'clock. At 8:30 a circuit is completed for the tripping coil 81t from the upper side of the supply line through its auxiliary contact, which is closed by the previous energization of the closing coil, through the tripping coil, the strips 37 and 44, and thence through the clock contacts and hands to the lower side of the supply line 80. The main switch is thus opened and the auxiliary cutoff contact of the tripping coil 81t deenergizes the coil. The entire apparatus is then deenergized except for the clock which, of course, is permanently connected to a source such as the line 80.

If it is desired to automatically control the selection of programs between 9:00 and 12:00, instead of between 7:00 and 10:00, the knob 69 is adjusted appropriately and the desired programs set up on the switchboard. The receiver may thus be automatically controlled throughout any desired three-hour period of the day, from one setting. The apparatus, furthermore, may be designed for greater ranges than three hours, as illustrated. The number of stations of which the apparatus is capable of tuning, furthermore, may be varied to suit individual conditions. Usually, however, from four to six will be sufficient.

A modified form of the means for indicating the period during which automatic control will be effected is shown in Figure 6. This comprises a shield 84 of transparent material, such as amber celluloid, attached to the cage 62 and co-extensive with the arc occupied by the contacts 38c through 50c. The shield moves with the cage, of course, and overlies the hours which the clock shows during which automatic control will be effected. Figure 6 shows the invention adapted to a four-hour range of automatic control.

Figures 7 through 9 illustrate an automatic shut-off mechanism utilizing the alarm device incorporated in some clocks. In electric clocks, the alarm usually takes the form of a switch actuated by the clock movement, and an electro-magnetic vibrator cooperating with a gong. As shown more clearly in Figure 8, the clock case 59, which may be the same as shown in Figure 3, carries a frame 85 projecting rearwardly therefrom. A pulley 86 journaled in the frame is secured to the alarm set shaft 87, which also projects rearwardly from the clock case. In order to permit the alarm set to be operated from the front of the cabinet, the pulley 86 is belted to a pulley 88. The pulley 88 is mounted on a shaft 89 which extends forwardly through the front wall of the cabinet and has a knob thereon for manual operation.

A toggle switch 90 is mounted on the frame 85. This switch controls the circuit to the primary of the supply transformer of the receiver. An operating arm 91 is secured to the switch. The upper end of the arm is connected by a link 92 to a crank 93 on a shaft 94. The shaft 94 extends forwardly of the receiver through the front wall thereof and has a knob thereon whereby the arm 91 may be shifted from the "off" position, wherein it is illustrated, to the "on" position. A spring 95 normally tends to shift the arm from the "on" to the "off" position.

A retractible detent 96 is adapted to enter a recess 97 in the arm 91 when the latter has been moved to the "on" position, and hold it there until the detent is retracted. The detent is withdrawn by the connection 98 to a finger 99 projecting from the rear of the clock face and adapted to be vibrated by the alarm mechanism at the time for which the alarm is set. When that time is reached, the finger 99 moves to the right, as viewed in Figure 9, withdraws the detent 96 and permits the spring 95 to shift the arm 91 back to its illustrated position.

The setting of the hour and minute hands of the clock may be accomplished through a shaft 100 journaled in the frame 85 and extended through the front wall of the cabinet where a knob is attached for manual operation. A pulley 101 on the shaft 100 is belted to a pulley 102 on the bushing 103a, which carries the minute hand of the clock. Figures 7 and 8 also illustrate a modified form of construction of the minute hand contact-making mechanism, one form of which is shown in Figure 3 at 75. In Figures 7 and 8, a disc 103 also mounted on the minute hand bushing, has pins 104 which serve as cams to operate a shiftable contact 105 into engagement with a relatively movable contact 106. Since the pins 104 are spaced at 90° around the periphery of the disc 103, the contact 105 is operated every fifteen minutes. The contacts 105 and 106 are thus the equivalent of the contact arm 75 and the contact points 76 of Figures 3 and 5.

Figures 10 through 13 illustrate a further form of mechanism for automatically turning on the receiver and shutting it off at preselected times independent of the switch board 30. This form of mechanism includes a fixed housing 107 secured in any convenient way to the rear of the clock case. The hour hand bushing 108 extends through the housing 107 and is rotatable relative thereto. Within the housing 107, discs 110 and 111 are rotatably mounted on the bushing 108. The housing and discs are preferably of insulating material. By means of slip rings 112 and sliding contacts 113 engaging therewith, contacts 114 and 115 on the discs 110 and 111 respectively, are connected in control circuits, to be described later. These circuits are closed by a contact 116 on an arm 117 which is firmly secured to the bushing 108 by a set screw 118. The discs 110 and 111 and, therefore, the contacts 114 and 115, may be positioned so as to be engaged by the contact 116 at any preselected hour. A conducting connection is made to the arm 117 through any convenient means, such as a brush sliding on the bushing 108.

Operating knobs 119 and 120 for the discs 110 and 111 are mounted on shafts extending through the front wall of the cabinet. The knobs have pointers cooperating with hour scales marked on the cabinet face. The shafts on which the knobs are mounted have sprockets 121 secured thereto. The discs 110 and 111 have sprocket teeth formed on the periphery thereof and are connected to the sprockets 21 through any suitable driving members, such as perforated strips 122. By this means, the contacts 114 and 115 can be positioned at any desired point on the hour scale. The friction of the shafts on which the sprockets 121 are mounted is sufficient to hold the discs 110 and 111 against rotation with the hour hand bushing 108.

The operation of the mechanism shown in Figures 10 through 12 will now be described by reference to Figure 13. A main switch 122a for connecting the primary of the supply transformer 123 of the receiver to a circuit 124, has closing and tripping windings 122c and 122t, each having its own cutoff contact in series therewith. The circuits of these coils are controlled by the contacts 114 and 115. If the "on" knob of Figure 12 has been set to say 1:30, the arm 117 will engage the contact 114 at that time and, at the instant when the contact 105 is actuated into engagement with the contact 106 by one of the cam pins 104 on the disc 103, at precisely the instant of the quarter hour, a circuit will be completed from one side of the supply source 124 through contacts 105 and 106, the arm 117, contact 114, the cut-off contact of the closing coil 122c and through the coil itself to the other side of the supply circuit. The primary of the transformer 123 is thus connected across the source 124. This switch may also serve to close a circuit for supplying energy to the tuning motor under the control of the automatic mechanism already described.

If the "off" knob of Figure 12 is set for 6:00 o'clock, the main switch 122a will remain closed until that time, when the arm 117 engages contact 115 on the disc 111. At the precise instant of 6:00, a circuit will be completed from one side of the supply 124 through contacts 105 and 106, the arm 117, contact 115, the cut-off contact of the tripping coil 122 which is closed when the main switch is closed, through the coil itself and to the other side of the supply line. The main switch is thus opened, as is also the cut-off contact for the tripping coil, restoring the circuit for the closing coil 122c when the arm 117 shall again engage the contact 114. It will be understood that the contacts 105 and 106 are closed only for an instant, to prevent vibration of the main switch 122a. In other words, by the time the switch 122a operates, the contact 105 has separated from the contact 106.

Figure 13 shows contacts 105' and 106' operated by the cam pins 104 on the disc 103. These may conveniently replace the contact arm 75 and contact points 76, as shown in Figures 3 and 5.

Referring now to Figures 14 and 15, I there show a modified form of construction of adjustable contact fingers. It will be recalled that these fingers may be set to various positions, to cause the automatic tuning mechanism to bring in different stations at selected times. According to the construction shown in Figures 14 and 15, the front wall of the cabinet, indicated at 125, has a sight opening 126 therein behind which the tape 127 which connects the motor pulley to the tuning shaft pulley, may be seen. In this form of the invention, the tuning scale is marked on the tape so as to be visible through the opening 126, and pointers 128 indicate the setting of the tuning mechanism. Contact buttons 129 are slidable in slots 130 on each side of the sight hole 126. The buttons have posts 131 extending through the slots 130. Contacts 132 on the posts engage the tape 127. Contacts 133 on the buttons engage one of several contact strips 134 secured to the inner surface of the front wall of the cabinet. Connections are made from these strips to the strips 32 through 37 of Figure 5. The sliding contacts 133 thus replace the flexible leads which are necessary in the modification of Figure 5. The operation of the mechanism shown in Figures 14 and 15, however, is the same as that of the construction of Figure 5.

In order to permit automatic operation of the tuning shaft without driving the manual tuning means, which may be difficult or impossible because of the gear reduction between the latter and the tuning shaft drive, I employ a clutch 135 shown in Figure 16. This clutch comprises a jaw member 136 fixed to the tuning shaft 11. An auxiliary shaft 137 is journaled in the cabinet coaxially with the shaft 11 and has a jaw member 138 splined thereon and a spring 139 normally urging the jaw 138 into engagement with the jaw 136. A clutch-operating link 140 is pivoted at 141 and extends outwardly through the slot in the front wall of the cabinet to permit manual disengagement of the clutch. When the link 140 is moved to the right as shown in Figure 16, a spring-operated detent 142 holds the link in such position against the force of spring 139. Automatic operation of the tuning shaft is then possible without interference by the drive actuated by the manual tuning knob. If it is desired to do manual tuning, the detent 142 is shifted by a knob 143. The spring 139 then causes the engagement of the clutch 135 whereby the knob 12 can be employed for manual tuning.

Since the automatic tuning motor 14 also operates through a built-in reducing gear (not shown), which might interfere with manual tuning of the shaft, I employ a clutch 144 shown in Figure 18, to disconnect the motor and the built-in reducing gear from the drive connecting the motor to the tuning shaft. This clutch comprises simply two jaw members, one mounted on the end of the motor shaft and the other mounted on the end of a coaxial shaft on which the pulley 16 is mounted. The motor 14 is slidable axially by means of a rack 145 and pinion 146. The pinion 146 is mounted on a shaft 147 which extends forwardly through the front wall of the cabinet and has a knob 148 mounted thereon. By turning the knob through a limited angle, the motor 14 is shifted so as to engage or disengage the clutch 144 in a manner which will be obvious from Figure 18. A spring 149 and crank 150 retain the motor in either position to which it is adjusted. When the clutch 144 has been disengaged, and the clutch 135 engaged, manual tuning of the receiver may be effected without the drag or interference which would result if the motor 14 were permanently connected to its drive. Instead of the clutch and operating mechanism shown in Figure 18, a clutch and operating mechanism such as that of Figures 16 and 17 may be disposed between the motor and tuning shaft.

It will be apparent from the foregoing description that the invention provides means for automatically tuning a radio receiver to different stations at different times, in accordance with a predetermined selection of programs. The device is simple in construction and inexpensive to manufacture. It is compact, furthermore, and capable of embodiment directly in existing designs of receivers. These characteristics of low cost and small bulk will make it possible for manufacturers of receivers to incorporate this much desired feature in their present designs of receivers very readily and without a material increase in the cost. The simplicity of construction and operation is attained largely by providing automatic control for only a limited period of time and making it possible to control the automatic control period to any hour of the day. The flexibility of the invention in permitting any station to be tuned in repeatedly and also making it possible for the operation of the receiver to be started and stopped at any time, is obtained through the switchboard having jacks for each station, as well as the "on" and "off" operation, for each quarter hour section of the automatic control period, and a sufficient number of plugs to enable the operator to set up even the most complicated program.

While I have illustrated and described herein but one preferred embodiment of the invention, it will be apparent that numerous changes in the apparatus disclosed may be made without departing from the spirit of the invention or the scope of the appended claims.

I claim:

1. Apparatus for automatically adjusting the tuning shaft of a radio receiver comprising a motor for driving the shaft, a pulley on the shaft and a second pulley spaced from the first, a flexible, electrically conducting member trained about said pulleys and having an insulating portion therein, and contact fingers movable in a rectilinear path for engaging said member between said pulleys, to energize the motor until the insulating portion engages one of said contact fingers.

2. In an automatic control system for a radio receiver, a control clock, a cage rotatable relative to the clock, a plurality of relatively fixed contacts carried by said cage and adapted to be engaged by a moving contact operated by said clock, a motor controlled by said relatively fixed contacts for causing the receiver to tune different stations at different times, and means mounting said relatively fixed contacts for adjusting movement about the clock.

3. The apparatus defined by claim 2 characterized by means operated by adjusting movement of said relatively fixed contacts for indicating the position thereof relative to the clock.

4. The apparatus defined by claim 1 characterized by said contact fingers having sliding engagement with fixed conducting members adjacent thereto.

5. Apparatus for automatically connecting a radio receiver to a supply circuit and disconnecting it therefrom at predetermined times comprising a pair of discs each having a contact thereon, a switch between the receiver and said circuit controlled by said contacts, manually operable means for rotating said discs to adjust the position of their contacts, a moving contact adapted to engage said first-mentioned contacts, and a constant speed drive for said moving contact.

6. Automatic means for operating the tuning shaft of a radio receiver comprising a motor for driving the shaft, a pair of spaced pulleys, one of which is in driving relation with said shaft, a flexible electric conductor trained about the pulleys and connected in series with said motor and a current source, and adjustable contacts engaging said conductor whereby to control said motor.

7. In an automatic control system for the tuning shaft of a radio receiver, the combination with a plurality of contacts corresponding to successive portions of time, a moving contact successively engaging said first mentioned contacts while traversing a predetermined path, and means controlled by said first mentioned contacts for tuning the receiver to different stations at predetermined times, said first mentioned contacts being fixed relative to each other but movable together to any position along said path.

8. Apparatus for automatically controlling the operation of a radio receiver tuning shaft mounted in a cabinet having a wall panel, comprising a motor for driving the shaft, a pulley mounted to move with the shaft, a pulley spaced therefrom, a belt of conducting material and divided in two sections by insulated joints trained around said pulleys, and a plurality of contact fingers mounted for rectilinear movement on said panel and adapted to engage said belt and energize the motor at predetermined times, until the insulated joint engages one of said contact fingers.

9. Apparatus for tuning a radio receiver mounted in a cabinet having a wall panel, to a plurality of different stations at different times comprising a motor for driving the receiver tuning shaft, a conducting belt mounted behind said panel so as to move on rotation of the shaft, and a plurality of contact fingers slidably mounted in slots formed in said panel for engaging said belt and adjustable in accordance with the adjustment of the tuning shaft when positioned for receiving the desired stations, and means for energizing said fingers and therefore the belt at predetermined times, the belt being connected in circuit with said motor.

10. A radio receiver comprising a case having a wall panel, a tuning shaft rotatably mounted in the case, a pair of spaced pulleys in the case, one being mounted to move with said shaft, a motor mounted in the case for actuating the shaft, a conducting belt trained around said pulleys and connected in circuit with said motor, and contacts slidably mounted on said panel and engaging said belt to control the motor.

11. Apparatus for automatically tuning a radio receiver having a tuning shaft, comprising a motor for driving the shaft, a pulley on said shaft, a second pulley spaced from the first and mounted for rotation, a flexible conducting belt trained around said pulleys and having insulated joints therein, a panel adjacent said belt and a plurality of contacts movable rectilinearly on said panel for engagement with said belt, said contacts and said belt being effective to control said motor.

12. Apparatus for automatically tuning a radio receiver having a tuning shaft, comprising a pair of spaced pulleys, one of which is mounted on said shaft, a flexible conducting belt having insulated joints trained over said pulleys, guides extending along the belt, a plurality of contacts movably mounted in said guides for engagement with said belt, a motor for driving said shaft, and a control circuit for said motor including a portion of said belt, energizable through any of said contacts.

ROBERT E. McCLURE.